United States Patent
Lovell et al.

(10) Patent No.: US 12,236,343 B2
(45) Date of Patent: Feb. 25, 2025

(54) SYSTEMS AND METHODS FOR REDUCING MEMORY REQUIREMENTS IN NEURAL NETWORKS

(71) Applicant: Maxim Integrated Products, Inc., San Jose, CA (US)

(72) Inventors: Mark Alan Lovell, Lucas, TX (US); Robert Michael Muchsel, Addison, TX (US)

(73) Assignee: Maxim Integrated Products, Inc., San Jose, CA (US)

(*) Notice: Subject to any disclaimer, the term of this patent is extended or adjusted under 35 U.S.C. 154(b) by 875 days.

(21) Appl. No.: 17/128,219

(22) Filed: Dec. 21, 2020

(65) Prior Publication Data

US 2021/0216868 A1 Jul. 15, 2021

Related U.S. Application Data

(60) Provisional application No. 62/958,666, filed on Jan. 8, 2020.

(51) Int. Cl.
*G06N 20/00* (2019.01)
*G06N 3/04* (2023.01)
*G06N 3/08* (2023.01)

(52) U.S. Cl.
CPC ............. *G06N 3/08* (2013.01); *G06N 3/04* (2013.01)

(58) Field of Classification Search
CPC .................................. G06N 3/08; G06N 3/04
See application file for complete search history.

(56) References Cited

U.S. PATENT DOCUMENTS

| 6,016,154 | A | 1/2000 | Moroo et al. |
| 7,082,419 | B1 | 7/2006 | Lightowler |
| 10,740,674 | B2 | 8/2020 | Ambrose et al. |
| 11,586,907 | B2 * | 2/2023 | Singh ............... G06N 3/045 |

(Continued)

FOREIGN PATENT DOCUMENTS

| CN | 106503791 A1 | 4/2019 |
| CN | 110050282 A1 | 7/2019 |
| CN | 110537193 A1 | 12/2019 |

OTHER PUBLICATIONS

Akbas, A., Yildiz, H., Ozbayoglu, A. et al., "Neural network based instant parameter prediction for wireless sensor network optimization models", Wireless Networks vol. 25, Springer Science+Business Media, LLC, Aug. 4, 2018, EP1-11 (Year: 2018).*

(Continued)

*Primary Examiner* — David R Vincent
(74) *Attorney, Agent, or Firm* — North Weber & Baugh; Michael North

(57) ABSTRACT

Described herein are systems and methods for efficiently processing large amounts of data when performing complex neural network operations, such as convolution and pooling operations. Given cascaded convolutional neural network layers, various embodiments allow for commencing processing of a downstream layer prior to completing processing of a current or previous network layer. In certain embodiments, this is accomplished by utilizing a handshaking mechanism or asynchronous logic to determine an active neural network layer in a neural network and using that active neural layer to process a subset of a set of input data of a first layer prior to processing all of the set of input data.

20 Claims, 9 Drawing Sheets

500

(56) References Cited

U.S. PATENT DOCUMENTS

| | | |
|---|---|---|
| 2016/0162782 A1 | 6/2016 | Park |
| 2017/0364792 A1 | 12/2017 | Chai et al. |
| 2018/0075343 A1 | 3/2018 | van den Oord et al. |
| 2018/0276534 A1 | 9/2018 | Henry |
| 2019/0102640 A1 | 4/2019 | Balasubramanian |
| 2019/0114534 A1 | 4/2019 | Teng et al. |
| 2019/0114548 A1 | 4/2019 | Wu et al. |
| 2019/0163716 A1* | 5/2019 | Li .................. G06N 3/045 |
| 2019/0205728 A1 | 7/2019 | Feng et al. |
| 2019/0205745 A1 | 7/2019 | Sridharan et al. |
| 2019/0209022 A1 | 7/2019 | Sobol et al. |
| 2019/0220734 A1 | 7/2019 | Ferdman et al. |
| 2019/0370647 A1 | 12/2019 | Doshi et al. |
| 2021/0073585 A1* | 3/2021 | Chuang ............. G06V 10/764 |
| 2022/0067527 A1* | 3/2022 | Xu .................. G06N 3/063 |

OTHER PUBLICATIONS

Chinese office action mailed Jun. 19, 2023 in related Chinese patent application No. 202110023177.3, (11 pgs).

Response to Chinese office action mailed Aug. 3, 2023 in related Chinese patent application No. 202110023177.3, (2 pgs).

Chinese office action mailed May 17, 2024 in related Chinese patent application No. 202110023177.3, (8 pgs).

Response to Chinese office action filed Jul. 5, 2024 in related Chinese patent application No. 202110023177.3, (2 pgs).

Chinese office action mailed Jan. 22, 2024 in related Chinese patent application No. 202110023177.3, (22 pgs).

Response to Chinese office action filed Mar. 5, 2024 in related Chinese patent application No. 202110023177.3, (17 pgs).

Chinese notice of allowance mailed Sep. 18, 2024 in related Chinese patent application No. 202110023177.3, (4 pgs).

* cited by examiner

600

SYSTEMS AND METHODS FOR REDUCING MEMORY REQUIREMENTS IN NEURAL NETWORKS

CROSS REFERENCE TO RELATED PATENT APPLICATIONS

This application is related to and claims the priority benefit, under 35 U.S.C. § 119(e), from U.S. Provisional Patent Application, Ser. No. 62/958,666 entitled "Systems and Methods for Reducing Memory Requirements in Neural Networks," filed Jan. 8, 2020 and listing as inventors Mark A. Lovell and Robert M. Muchsel. Each reference mentioned in this patent document is incorporated by reference herein in its entirety and for all purposes.

BACKGROUND

A. Technical Field

The present disclosure relates generally to reducing memory and computational requirements in neural networks, such as convolutional neural networks (CNNs). More particularly, the present disclosure relates to systems and methods for efficiently processing large amounts of data when performing complex neural network operations such as convolution or pooling operations.

B. Background

Machine learning is a subfield of artificial intelligence that enables computers to learn by example without being explicitly programmed in a conventional sense. Some of the most exciting applications of machine learning utilize a CNN, i.e., a supervised network that is capable of solving complex classification or regression problems, e.g., for image or video processing applications. A CNN uses as input large amounts of multi-dimensional training data, such as image or sensor data to learn prominent features therein. A trained network can be fine-tuned to learn additional features. In an inference phase, i.e., once training or learning is completed, the CNN uses unsupervised operations to detect or interpolate previously unseen features or events in new input data to classify objects, or to compute an output such as a regression. For example, a CNN model may be used to automatically determine whether an image can be categorized as comprising a person or an animal.

The CNN applies a number of hierarchical network layers and sub-layers to the input image when making its determination or prediction. A network layer is defined mainly by four parameters: 1) the size of the kernel (or weight), which is related to the receptive field that the filter spans; 2) the number of kernels that determine the number of feature maps; 3) the stride, i.e., the step size the kernel moves per output computation; and 4) the amount of padding applied to input data to generate an output map having a desired size. One characteristic of CNNs is that each network layer serves as an output of a previous layer, typically starting at a first convolutional layer and ending with one or more final layers, e.g., a fully connected layer that includes nodes whose activation values deliver scores. The scores indicate a likelihood that an input image can indeed be classified as comprising a certain object.

A convolution layer may use several kernels that apply a set of weights to the pixels of a convolution window of an image. The weights learned by the CNN during the training phase generate an activation value associated with that window. For each kernel, the convolution layer may have, for each pixel, one node, i.e., neuron, that outputs an activation value that is calculated based on the set of weights. The activation value for the convolution window identifies a feature or characteristic, such as an edge that can be used to identify the feature at other locations within the image.

Since all nodes for a filter can share the same set of weights, reusing weights is a common technique to increase utilization of both storage space for weights and computation time when compared to fully connected neural networks also known as multilayer perceptrons or MLPs. Unlike MLPs, where one weight for each combination of input and output pixel is required, the same weights can be reused for each combination of input and output frames.

FIG. 1 is a general illustration of how in a common CNN a receptive field saves weight memory by passing the same small receptive field 104 over several channels (or planes) of data. Once all input data 102 of a layer is processed within a memory device (not shown) to generate output 110 for that layer, input data 102 in the memory device is discarded and output data 110 is used as a new input for the next layer. In other words, layers are processed sequentially, one layer at a time. Since processing relatively large images and high-resolution video requires amounts of data memory that exceeds the available memory in a cost-effective embedded device, existing image or video processing applications are limited to thumb-nail size images when using small embedded devices. Conventional implementations reserve one full frame's worth of buffer space for intermediate data, thus, driving up storage requirements. As an example, processing 8-bit-per-channel VGA video using a CNN having a width of 128 output channels in the first hidden layer requires 640×480×128=39,321,600 bytes (or 37.5 MiB) of intermediate storage for one layer, and even more when considering additional layers of a deep neural network (DNN). Similarly, a 4 k 8-bit HD image requires 3840×2160×128=1,061,683,200 bytes (or 1,012.5 MiB) for a single layer.

Accordingly, what is needed are high-throughput methods and cost-effective embedded "at-the-edge" devices that can perform mathematical operations inherent to cascaded CNN layers quickly and efficiently by processing more than a single neural network layer at the same time such as to enable high-resolution image and video processing with relatively small memory size.

BRIEF DESCRIPTION OF THE DRAWINGS

References will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments. Items in the figures are not to scale.

DETAILED DESCRIPTION OF EMBODIMENTS

Figure 1:
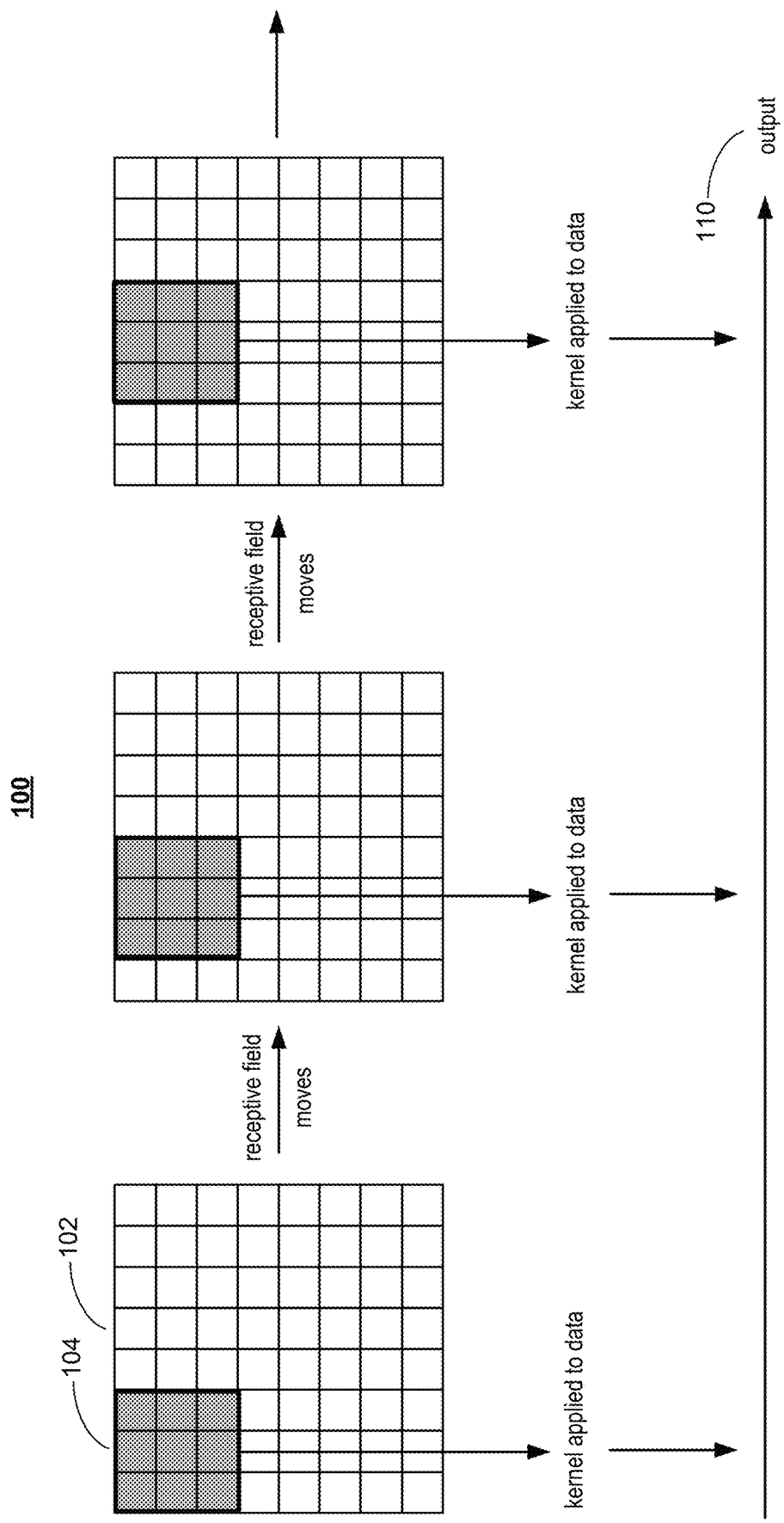
FIG. 1 is a general illustration of how a receptive field in a common CNN saves weight memory.

In the following description, for purposes of explanation, specific details are set forth in order to provide an understanding of the invention. It will be apparent, however, to one skilled in the art that the invention can be practiced without these details. Furthermore, one skilled in the art will recognize that embodiments of the present invention, described below, may be implemented in a variety of ways, such as a process, an apparatus, a system, a device, or a method on a tangible computer-readable medium.

Components, or modules, shown in diagrams are illustrative of exemplary embodiments of the invention and are meant to avoid obscuring the invention. It shall also be understood that throughout this discussion that components may be described as separate functional units, which may comprise sub-units, but those skilled in the art will recognize that various components, or portions thereof, may be divided into separate components or may be integrated together, including integrated within a single system or component. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "coupled," "connected," or "communicatively coupled" shall be understood to include direct connections, indirect connections through one or more intermediary devices, and wireless connections.

Reference in the specification to "one embodiment," "preferred embodiment," "an embodiment," or "embodiments" means that a particular feature, structure, characteristic, or function described in connection with the embodiment is included in at least one embodiment of the invention and may be in more than one embodiment. Also, the appearances of the above-noted phrases in various places in the specification are not necessarily all referring to the same embodiment or embodiments.

The use of certain terms in various places in the specification is for illustration and should not be construed as limiting. A service, function, or resource is not limited to a single service, function, or resource; usage of these terms may refer to a grouping of related services, functions, or resources, which may be distributed or aggregated.

The terms "include," "including," "comprise," and "comprising" shall be understood to be open terms and any lists the follow are examples and not meant to be limited to the listed items. Any headings used herein are for organizational purposes only and shall not be used to limit the scope of the description or the claims. Each reference mentioned in this patent document is incorporate by reference herein in its entirety.

Furthermore, one skilled in the art shall recognize that: (1) certain steps may optionally be performed; (2) steps may not be limited to the specific order set forth herein; (3) certain steps may be performed in different orders; and (4) certain steps may be done concurrently.

In this document the terms kernel, weight, filters, and activation function are used interchangeably. "Layer" includes any neural network layer known in the art.

It is noted that although embodiments described herein are given in the context of a layer-by-layer treatment, it is envisioned that one or more mathematical equations may be used to describe an entire network to achieve the objectives and advantages of the present disclosure. In particular, the present disclosure may be applied to networks that make use of an input plane-by-input plane structure.

Figure 2:
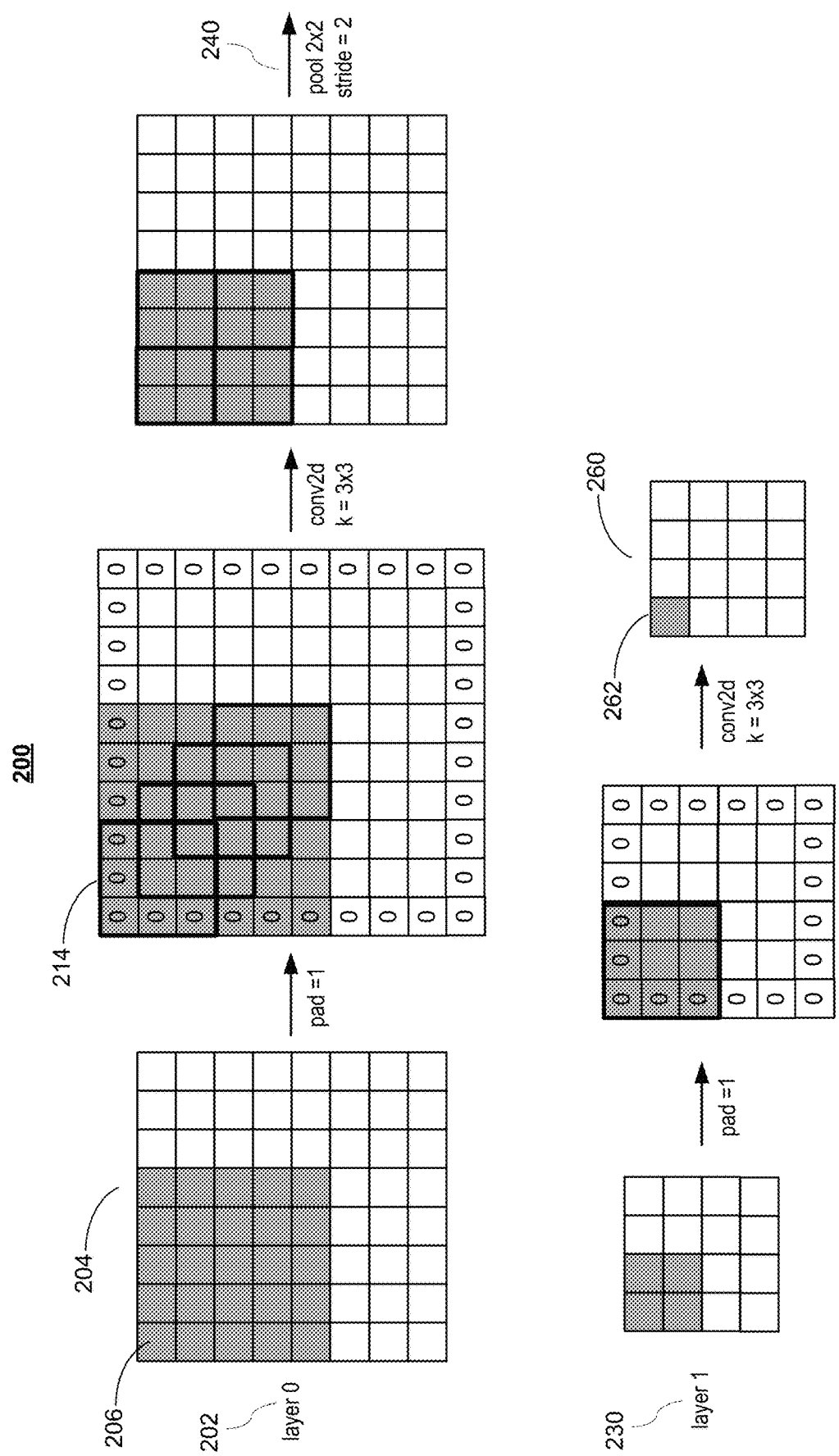
FIG. 2 illustrates a method for using two simplified CNN layers to produce an output pixel by using less than all available input data, according to various embodiments of the present disclosure.

FIG. 2 illustrates a method for using two simplified CNN layers to produce output pixels by using less than all available input data, according to various embodiments of the present disclosure. Convolutional layer 202, 230 in FIG. 2 may use multiply-and-accumulate operations. In embodiments, convolutional layer 202, 230 may compute different filters 214 for each feature map, each filter 214 representing features common to input data 204, e.g., trained input data. A CNN may apply learned filters 214 to input data 204 to extract features, such as edges, orientation; and at deeper levels, structures and shapes. In embodiments, pooling 240 may perform subsampling operations to reduce output map dimensions of convolutional layer 202. It is understood that convolutional layer and pooling operations may be applied any number of times, e.g., before the output of a fully-connected layer (or, for classification tasks, an MLP) (not shown) is tested to determine whether a pattern has been successfully recognized.

In detail, convolution layer 202 applies a filter operation to an input signal, e.g., to pixels of an input image, by convolving filter 214 over input image 204. The filter results are summed and output from convolution layer 202 to pooling 240 that performs subsampling operations to reduce data size. A two-dimensional convolution operation involves the generation of output feature maps for a layer by using data in a 2D window from a previous layer. Each feature point in the output feature map is the weighted sum of the input data passed through a nonlinear activation function. The window is then moved by a given stride, here a stride of two, to produce the next feature point reapplying (reusing the same calculation circuits) the same weights to the new layer 230, thus, taking advantage of weight-sharing by two or more convolutional layers.

To generate output pixel 262 in FIG. 2, only 5×5 input data 206 is used. It is noted that for similar networks having significantly larger input data, the same 5×5 input data 206 would be used to generate output pixels. As a result, processing layer 230 may commence prior to all input data 202 have been processed, i.e., before the entire output of layer 204 has become available. Similarly, processing a third layer (not shown) may commence before the entire output of layer 230 has become available, and so on.

In short, a neural layer network may produce an output pixel by using less than all input data 204 that may otherwise be available. As a result, embodiments described herein allow for input data dimensions that exceed the available per-channel data memory by one or more orders of magnitude. In various embodiments, this may be achieved by streaming data into a CNN accelerator circuit, as discussed in greater detail with reference to FIG. 7. This principle holds true for different types of data sources, such as audio or time series sensor data, but is most easily understood when considering video (image) data. Embodiments of the present disclosure take advantage of the fact that for video or image data, a sensor typically scans row-by-row across a frame, and the output is sequenced in the same manner.

Figure 3:
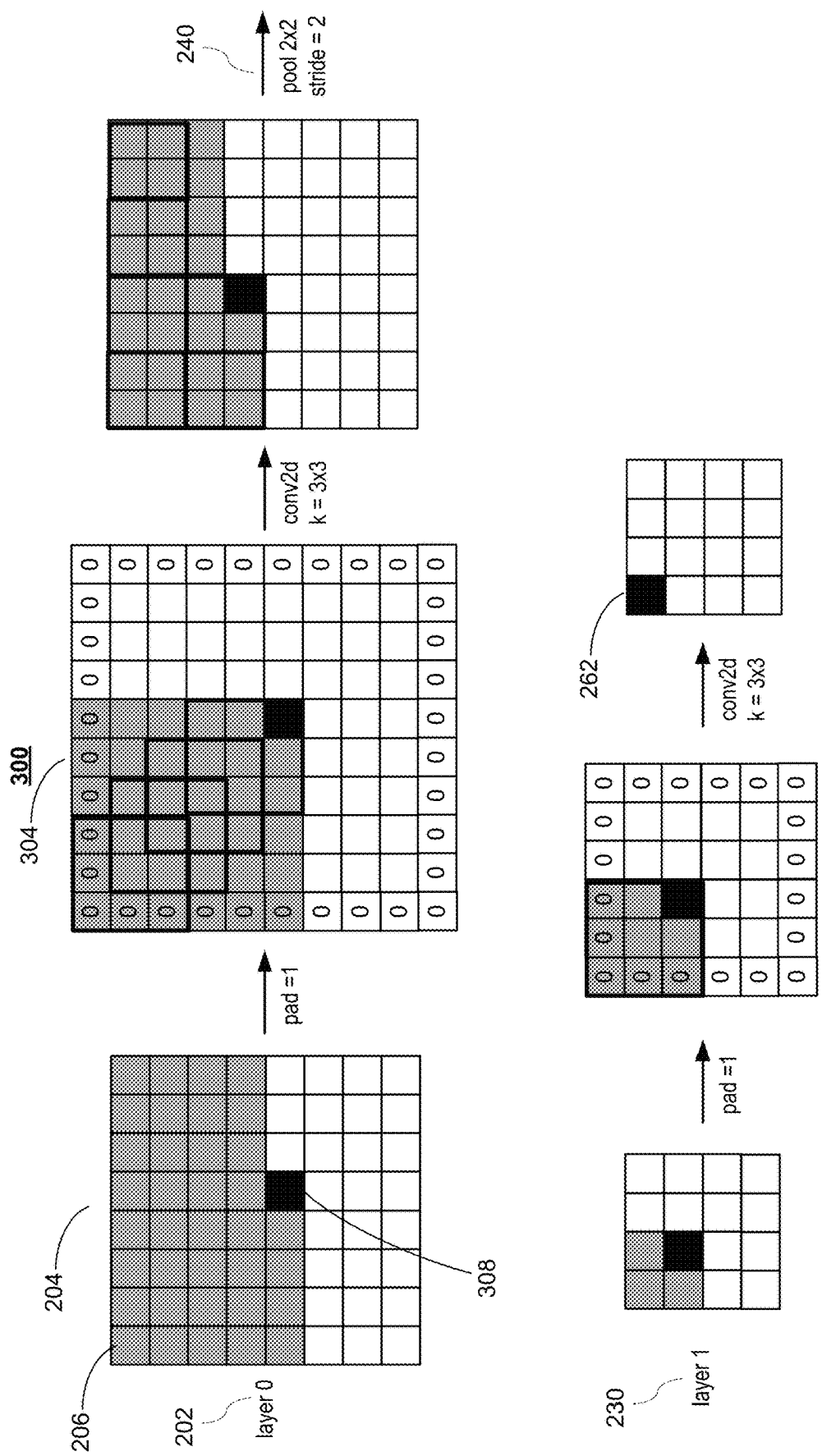
FIG. 3 illustrates an exemplary row-based implementation of the method illustrated in FIG. 2.

FIG. 3 illustrates an exemplary row-based implementation of the method illustrated in FIG. 2. For clarity, components similar to those shown in FIG. 2 are labeled in a similar manner. For purposes of brevity, a description or their function is not repeated here.

In embodiments, data is shifted into a memory device (not shown) in a sequential fashion row-by-row, for example, from an image sensor (also not shown), such that a certain number of prior rows is available for processing. In embodiments, in order to output pixel 262 (in black color), input data 204 up to and including input pixel 308 are used, and input data following pixel 308 is ignored, thereby, saving computing resources that may advantageously be used to perform other or additional computations, such as processing more than one neural network layer at the same time.

Figure 4:
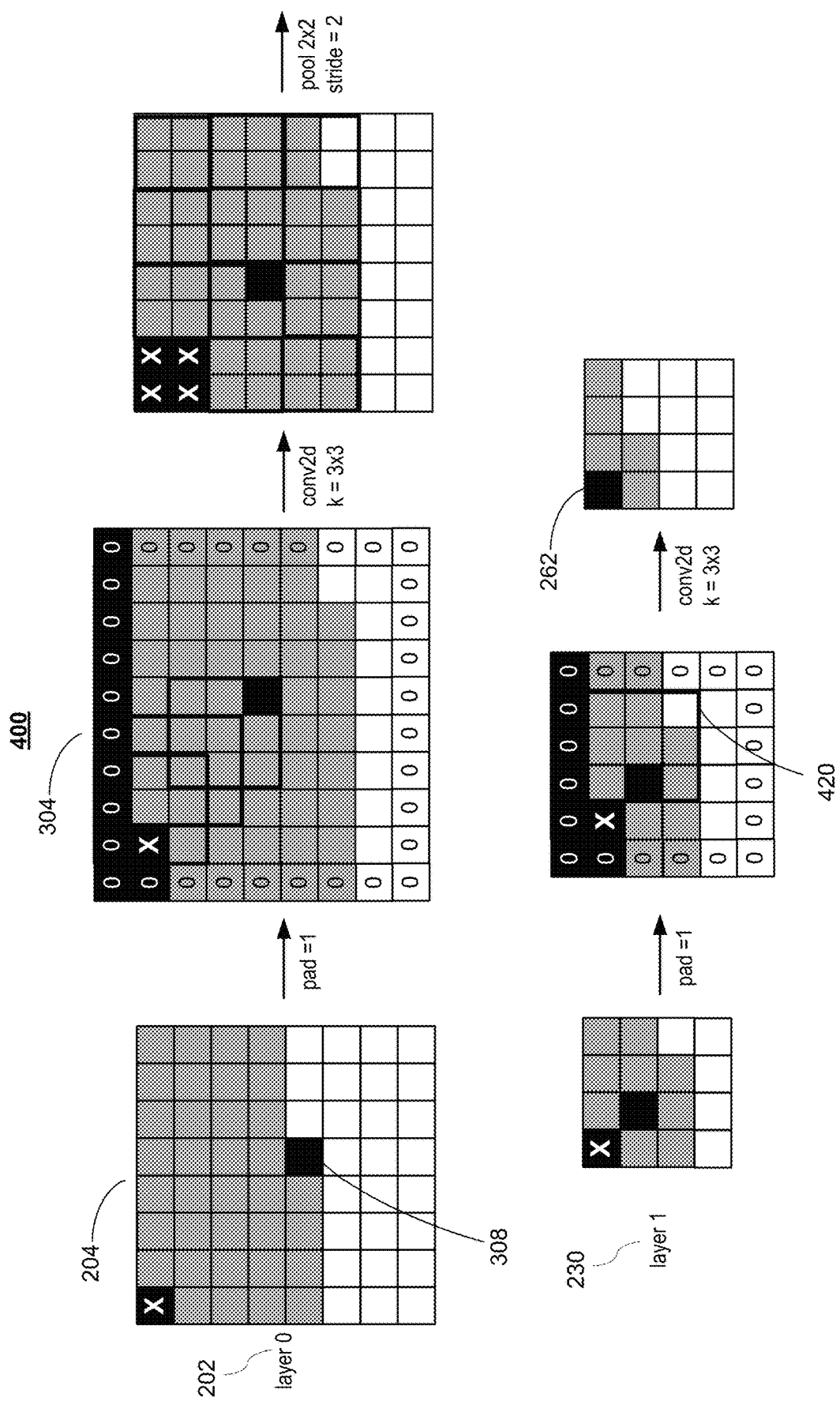
FIG. 4 illustrates a point in time when certain input data is no longer needed to generate a next output pixel of a CNN layer and, thus, may be discarded to save computing resources according to various embodiments of the present disclosure.

FIG. 4 illustrates a point in time when certain input data is no longer needed to generate a next output pixel of a CNN layer and, thus, may be discarded to save computing resources according to various embodiments of the present disclosure. In a manner similar to FIG. 3, to produce input pixel 308, preceding data in input 204, i.e., all preceding data except pixel 308, are used. In embodiments, once output pixel 420 is produced, the pixel denoted "X" in padded input data 304 in FIG. 4 is no longer needed and its data may be discarded.

More and more data from prior layers may be discarded by, in effect, ignoring boundaries of CNN layers (e.g., 202, 230). In embodiments, this allows for the use of a rolling buffer size that is orders of magnitude smaller than what would otherwise be required to store an entire intermediate data set as an intermediate result, e.g., an entire image, between each layer. Advantageously, this enables existing hardware to process VGA-size or HD-size images.

A person of skill in the relevant art will appreciate that the number of discarded pixels may be specific to, e.g., the type of neural network used, and may be dependent on pooling stride, type of convolution, and the like.

While neural networks are generally organized in layers (e.g., 202, 230) that operate on multiple input planes (or channels) each, it should be noted that this is mostly convention and not a necessity for employing the systems and methods described in this document. When using layers as the most abstract structure in a CNN as illustrated in FIG. 1-4, each layer (e.g., 202) may control data flow by asserting whether the layer needs additional data to perform a certain convolution. While it is possible to derive equations that apply for several network layers, or even for an entire network, a more hardware-friendly approach is to control each layer based on a subsequent layer or an active layer based on a non-active layer. As discussed next, various embodiments disclosed herein may use handshaking or sequencing mechanisms to determine which layer (or layers) is active at any given time to generate a desired output that, advantageously, allows for processing more than a single CNN layer at the same time.

Figure 5:
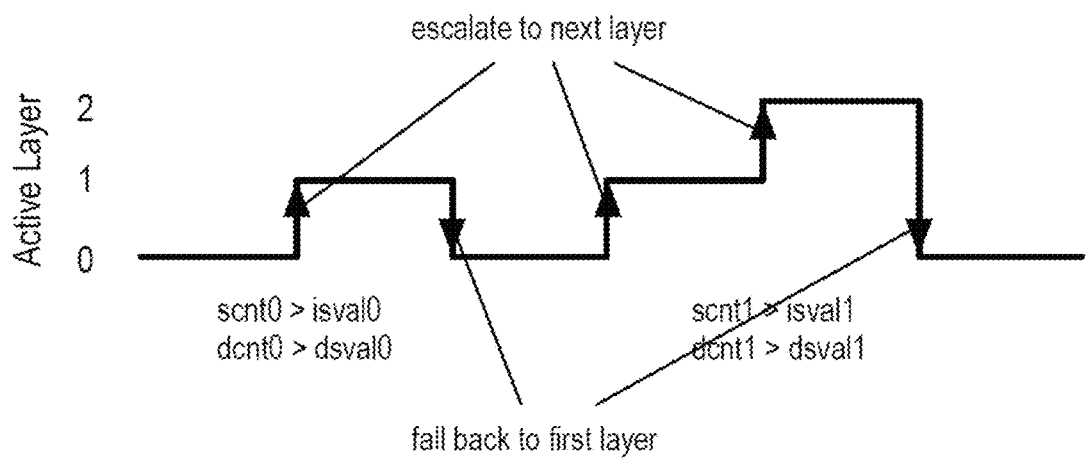
FIG. 5 illustrates an exemplary layer escalation method using counters according to various embodiments of the present disclosure.

FIG. 5 illustrates an exemplary layer escalation method that uses counters according to various embodiments of the present disclosure. In embodiments, three counters, e.g., user-configurable counters depicted in FIG. 6, may be used to control data flow, for example, by counting bytes, pixels, or input shifts as follows: A first counter, referred to herein as "start counter" (scnt), may be used to count until sufficient information becomes available to commence a first operation, e.g., a convolution or pooling operation in a layer (e.g., layer 1).

A second counter, referred to as "column delta value" (dcnt), may be used to determine how much information is needed between operations, such as convolution operations, in the same row before processing reaches the end of the row. In embodiments, that information may be derived from the number of column moves in one direction to generate an output pixel. For example, for a 2×2 pooling operation (e.g., shown in FIG. 2), moving to the right by two columns enables the generation of an output pixel.

A third counter, referred herein as the "row delta value," may be used to determine how much information is needed between rows. For example, for the 2×2 pooling operation, moving down two rows enables the generation of a 4×4 matrix. It is noted that in embodiments that do not utilize pooling operations, only the start counter and column delta value may be used without using the row delta value, as in FIG. 5.

In embodiments, the three counters may be used to determine an active layer, according to a process flow illustrated in FIG. 5. This flow, e.g. a push-pull mechanism between layers, may be implemented by using a conventional digital handshaking mechanism or, in some embodiments, the flow may be implemented by using asynchronous logic in a local or global asynchronous controller that may control certain parts of layers.

In embodiments, the handshaking mechanism may utilize a rolling buffer that has (e.g., a programmable) size and uses a start value, a column delta, and a row delta to facilitate handshaking and data flow at a substantially constant pace. In embodiments, these parameters may be user-defined or computed by software and stored in a register, e.g., in a controller that may determine a suitable count(er) for each layer.

In embodiments, the active layer may be switched from one layer to another depending on which layer requests (or is able to receive) data as determined based on a signaling between individual layers. For example, to enable unimpeded data flow, each active layer may notify its prior layer about its ability to receive data. In embodiments, as indicated by the example in FIG. 5, a set of comparators may be used to determine whether the start counter for layer 0 (scnt0) exceeds an input shift value for layer 0 (isval0) and further determine whether the column delta value (dcnt0) for layer 0 exceeds the delta shift value for layer 0 (dsval0). If so, then layer 1 may become the active layer, where a number of operations are performed, e.g., until either these conditions are no longer satisfied, or the data in the buffer processing layer 1 has already been consumed, at which point the system returns to processing layer 0 as the active layer, e.g., to allow a processor to perform mathematical operations for layer 0, thereby, facilitating a continuous data stream.

Alternatively, if, at layer 1, the comparator(s) determine that the start counter for layer 1 (scnt1) exceeds the input shift value for layer 1 (isval1) and the column delta value for layer 1 (dcnt1) exceeds the delta shift value for layer 1

(dsval1), then, layer 2 may become the active layer, e.g., prior to returning to the first layer, here layer 0, and so on.

In short, the controller may determine whether sufficient data has been accumulated to perform an operation in layer n before proceeding with receiving additional input data or performing an operation in another layer.

In embodiments, each layer may have its own rolling or intermediate buffer(s) that may be hardware-implemented between network layers. However, this is not intended as a limitation on the scope of the present disclosure since, as a person of skill in the art will appreciate, one buffer may serve more than one layer, e.g., sequentially. A person of skill in the art will further appreciate that once a buffer accumulates too much data, it may run out of available space. Conversely, if the buffer(s) are too small, this may result in an undesirable underutilization of resources.

In embodiments, input planes or channels may be used as the highest-level structure rather than layers, depending on the connectivity of the underlying network. In embodiments, instead of (or in addition to) layer-to-layer communication, independent input channels may communicate to each other using an asynchronous controller that uses a digital handshaking mechanism to optimize the use of planes, for example, by eliminating one or more layers or allowing a plane in one layer (e.g., layer 2) to communicate with a plane in another layer (e.g., layer 0). As a result, two or more channels may be processed in a single memory device at a same time.

It is noted that other data structures in a neural network, which may have a relationship to each other, may similarly be processed in a single memory device and at a same time. Exemplary relationships comprise hierarchical, temporal, and any other relationship that connect two or more data structures to each other, e.g., one data structure being the input (or output) of the other, or one data structure being used to modify the other.

In embodiments, to enhance performance, the input data rate may be matched to the processing speed of a particular CNN, which should be at least as fast as the data source but, in embodiments, may be slowed down to process data, for example, no faster than (on average) the data delivered to the system. In embodiments, this may be accomplished by pausing or utilizing a stalling mechanism that controls the data flow through the CNN. In embodiments, the input data rate may be determined by the handshake mechanism itself or it may be programmable.

Figure 6:
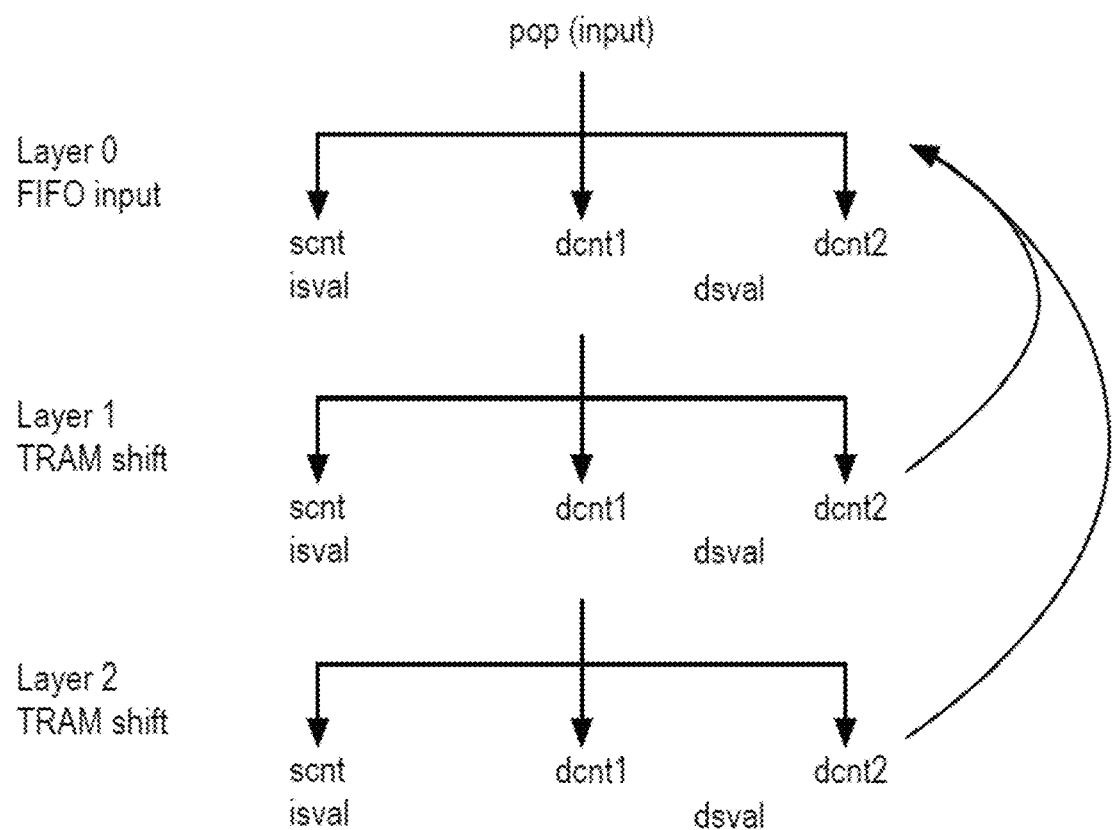
FIG. 6 illustrates the use of three counters per layer according to various embodiments of the present disclosure.

FIG. 6 illustrates the use of three counters per layer, according to various embodiments of the present disclosure. FIG. 6 corresponds to the layer escalation method using counters illustrated in FIG. 5 with the main difference being that FIG. 6 also shows the hierarchical relationship between three layers to better illustrate the fallback to layer 0. The pop (input) may comprise data that has been received from a FIFO. However, it is noted that various streaming implementations do not require a FIFO.

Figure 7:
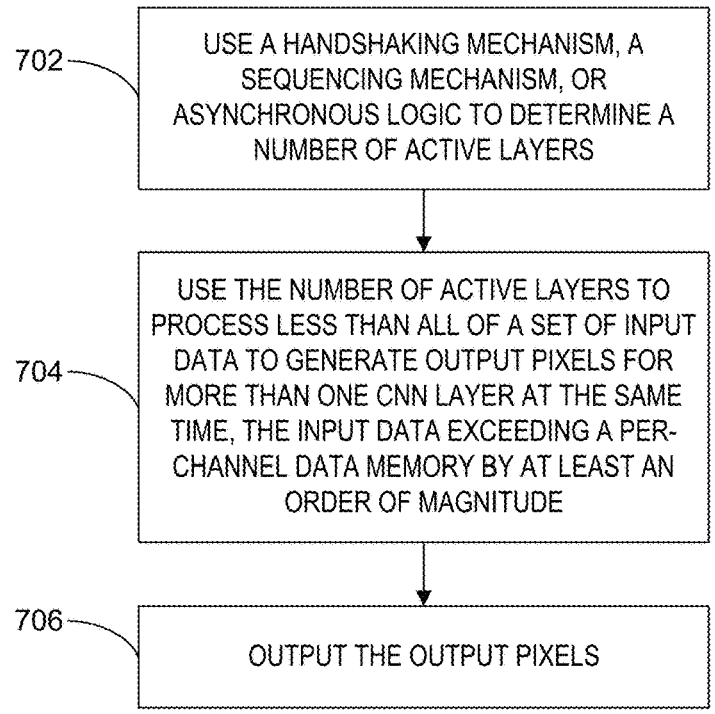
FIG. 7 is a flowchart of an illustrative process for efficiently processing large amounts of data when performing complex operations in neural networks in accordance with various embodiments of the present disclosure.

FIG. 7 is a flowchart of an illustrative process for efficiently processing large amounts of data when performing complex operations in neural networks in accordance with various embodiments of the present disclosure. In embodiments, process 700 begins when a handshaking mechanism, a sequencing mechanism, or asynchronous logic is used to determine a number of active layers.

At step 704 the number of active layers is used to process less than all of a set of input data to generate output pixels for more than one CNN layer at the same time, the input data exceeding a per-channel data memory by at least an order of magnitude.

Finally, at step 706 the output pixels are output.

Figure 8:
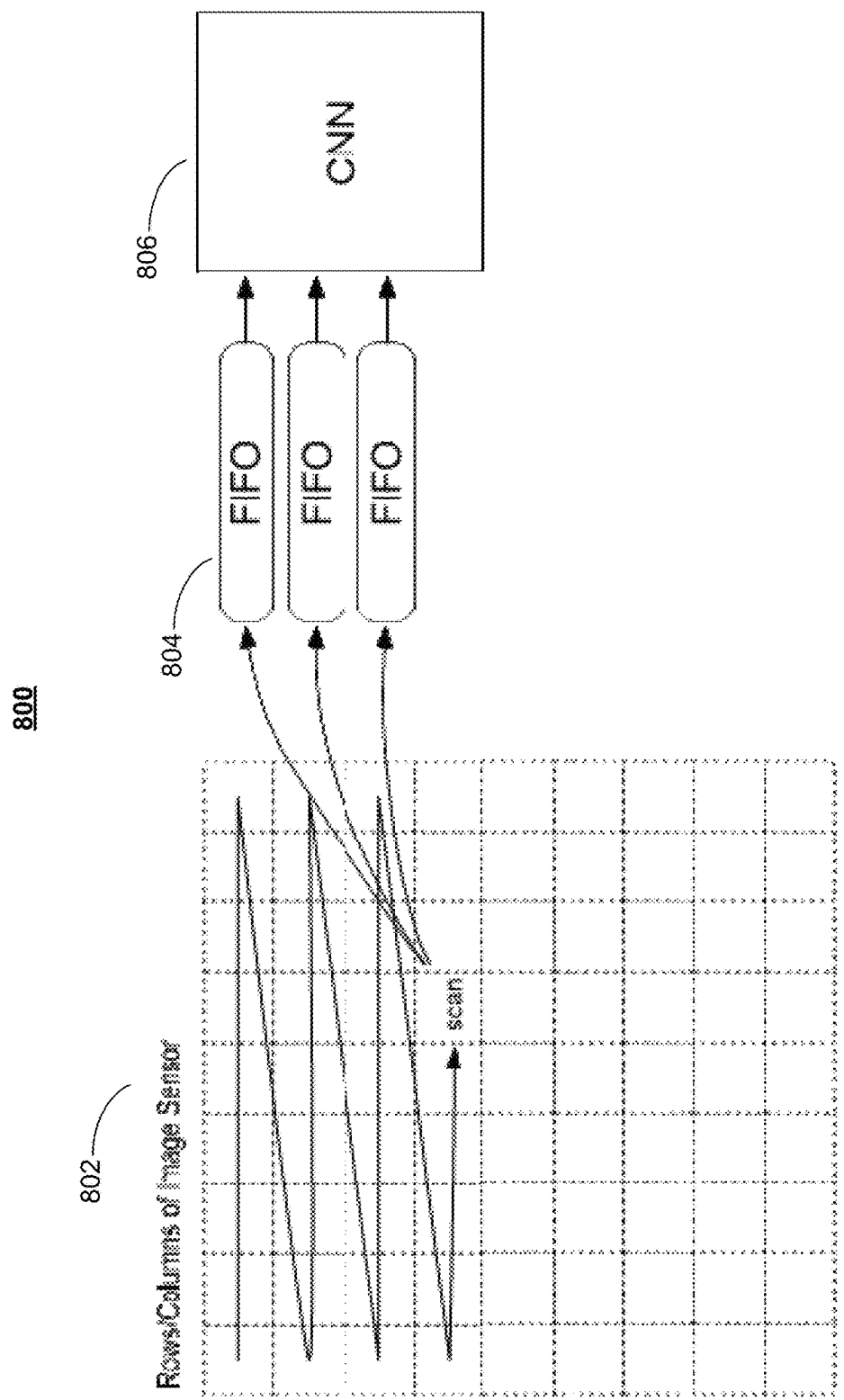
FIG. 8 illustrates an accelerator system according to various embodiments of the present disclosure.

FIG. 8 illustrates an accelerator system according to various embodiments of the present disclosure. Accelerator system 800 comprises image sensor 802, FIFOs (e.g., 804), and CNN 806. In embodiments, one or more FIFOs 804 may be used, e.g., one for red, green, blue components or pixels. Other examples include a single FIFO (e.g., 804) that may be used for raw sensor values, and additional channels may be used for stereo cameras or infrared imaging.

Accelerator system 800 illustrated in FIG. 8 is not limited to the constructional detail shown there or described in the accompanying text. As those skilled in the art will appreciate, a suitable hardware accelerator may comprise a controller that may be coupled between the image sensor 802 and FIFO 804.

As one skilled in the art will appreciate, an efficient input mechanism may greatly improve the efficacy of the disclosed systems and methods. Therefore, in embodiments, FIFOs 804 or rolling buffer memories may be implemented as a type of intermediate storage that may feed data into CNN 806, which may be appropriately trained to output a decision result or output another data stream. In embodiments, non-input data may use rolling buffer memories that act like FIFO 804.

Likewise, image sensor 802 may be configured to directly couple to a hardware accelerator to output its sampled values directly to the accelerator in a streaming fashion, e.g., scanning row-by-row. In such streaming implementation, image sensor 802 may sequentially scan rows and columns and, in some embodiments, output horizontal and vertical synchronization signals, such as HREF and VSYNC. Advantageously, closely coupling image sensor 802 with CNN 806 reduces communications overhead and requires very little or no intermediate storage.

In embodiments, accelerator system 800 may autonomously fetch data from the input, e.g., by using FIFOs 804, as needed, and stall or pause when not enough data is available to perform a next operation. In embodiments, data input may utilize a controller-free bus master (not shown) that autonomously, i.e., directly, adds image sensor data to one or more input FIFOs 804 once sensor data becomes available.

It is understood that streaming input data may be especially useful for neural networks where the output data dimensions decrease from one layer to another layer, for example, when a pooling operation is used.

Figure 9:
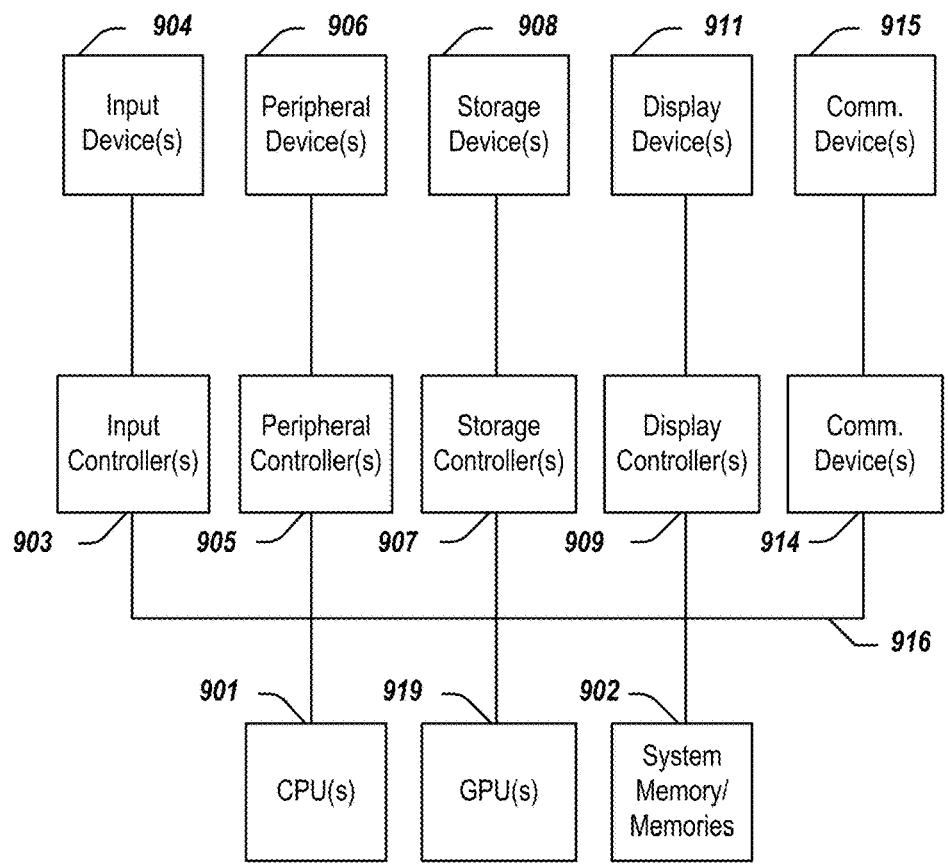
FIG. 9 depicts a simplified block diagram of a computing device/information handling system in accordance with embodiments of the present disclosure.

FIG. 9 depicts a simplified block diagram of an information handling system (or computing system) according to embodiments of the present disclosure. It will be understood that the functionalities shown for system 900 may operate to support various embodiments of a computing system—although it shall be understood that a computing system may be differently configured and include different components, including having fewer or more components as depicted in FIG. 9.

As illustrated in FIG. 9, the computing system 900 includes one or more central processing units (CPU) 901 that provides computing resources and controls the computer. CPU 901 may be implemented with a microprocessor or the like, and may also include one or more graphics processing units (GPU) 919 and/or a floating-point coprocessor for mathematical computations. System 900 may also include a system memory 902, which may be in the form of random-access memory (RAM), read-only memory (ROM), or both.

A number of controllers and peripheral devices may also be provided, as shown in FIG. 9. An input controller 903 represents an interface to various input device(s) 904, such as a keyboard, mouse, touchscreen, and/or stylus. The computing system 900 may also include a storage controller 907 for interfacing with one or more storage devices 908 each of which includes a storage medium such as magnetic tape or disk, or an optical medium that might be used to record programs of instructions for operating systems, utilities, and applications, which may include embodiments of programs that implement various aspects of the present disclosure. Storage device(s) 908 may also be used to store processed data or data to be processed in accordance with the disclosure. The system 900 may also include a display controller 909 for providing an interface to a display device 911, which may be a cathode ray tube (CRT), a thin film transistor (TFT) display, organic light-emitting diode, electroluminescent panel, plasma panel, or other type of display. The computing system 900 may also include one or more peripheral controllers or interfaces 905 for one or more peripherals 906. Examples of peripherals may include one or more printers, scanners, input devices, output devices, sensors, and the like. A communications controller 914 may interface with one or more communication devices 915, which enables the system 900 to connect to remote devices through any of a variety of networks including the Internet, a cloud resource (e.g., an Ethernet cloud, a Fiber Channel over Ethernet (FCoE)/Data Center Bridging (DCB) cloud, etc.), a local area network (LAN), a wide area network (WAN), a storage area network (SAN) or through any suitable electromagnetic carrier signals including infrared signals.

In the illustrated system, all major system components may connect to a bus 916, which may represent more than one physical bus. However, various system components may or may not be in physical proximity to one another. For example, input data and/or output data may be remotely transmitted from one physical location to another. In addition, programs that implement various aspects of the disclosure may be accessed from a remote location (e.g., a server) over a network. Such data and/or programs may be conveyed through any of a variety of machine-readable medium including, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices.

Aspects of the present disclosure may be encoded upon one or more non-transitory computer-readable media with instructions for one or more processors or processing units to cause steps to be performed. It shall be noted that the one or more non-transitory computer-readable media shall include volatile and non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that embodiments of the present disclosure may further relate to computer products with a non-transitory, tangible computer-readable medium that have computer code thereon for performing various computer-implemented operations. The media and computer code may be those specially designed and constructed for the purposes of the present disclosure, or they may be of the kind known or available to those having skill in the relevant arts. Examples of tangible computer-readable media include, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices. Examples of computer code include machine code, such as produced by a compiler, and files containing higher level code that are executed by a computer using an interpreter. Embodiments of the present disclosure may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize no computing system or programming language is critical to the practice of the present disclosure. One skilled in the art will also recognize that a number of the elements described above may be physically and/or functionally separated into sub-modules or combined together.

It will be appreciated to those skilled in the art that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of any claims may be arranged differently including having multiple dependencies, configurations, and combinations.

What is claimed is:

1. A method for processing large amounts of neural network data, the method comprising:
    determining one or more active neural network layers in a neural network using counters, wherein the counters control a set of input data by counting input shifts of data into the one or more active neural network layers relative to at least one shift value to identify the one or more active neural network layers;
    using the one or more active neural network layers to process a subset of the set of input data of a first neural network layer, the subset having a data size that is substantially less than the size of the set of input data;
    outputting a first set of output data from the first neural network layer;
    using the first set of output data in a second neural network layer; and
    outputting a second set of output data from the second neural network layer prior to processing all of the set of input data.

2. The method according to claim 1, further comprising discarding at least some of the subset after outputting the first set of output data.

3. The method according to claim 1, wherein the size of the subset depends at least on one of a pooling stride or a type of convolution, or the type of the neural network.

4. The method according to claim 1, wherein outputting the first set of output data comprises generating an output pixel in response to using input data up to and including a first input pixel and ignoring input data following the first input pixel.

5. The method according to claim 1, wherein the set of input data comprises at least one of audio data or image sensor data, the input data being scanned row-by-row and the first set of output data is sequenced row-by-row.

6. The method according to claim 1, further comprising using at least one of a handshaking mechanism, a sequencing mechanism, or asynchronous logic that determines the one or more active neural network layers.

7. The method according to claim 1, wherein the set of input data is shifted row-by-row into a memory device in a sequential fashion such that data that has been shifted from one or more rows is available for processing.

8. The method according to claim 1, wherein the data size is less than the size of the input data, and wherein a dimension of an output of the first neural network layer is greater than a dimension of an output of the second neural network layer.

9. A system for processing large amounts of neural network data, the system comprising:
a processor; and
a non-transitory computer-readable medium comprising instructions that, when executed by the processor, cause steps to be performed, the steps comprising:
determining one or more active layers in a neural network using counters, wherein the counters control a set of input data by counting input shifts of data into the one or more active neural network layers relative to at least one shift value to identify the one or more active neural network layers;
using the one or more active layers to process a subset of the set of input data of a first neural network layer the subset having a data size that is substantially less than the size of the set of input data;
outputting a first set of output data from the first network layer;
using first set of output data in a second neural network layer; and
outputting a second set of output data from the second network layer prior to processing all of the set of input data.

10. The system according to claim 9, further comprising a rolling buffer coupled to the processor, the rolling buffer that processes the subset of the set of input data.

11. The system according to claim 10, wherein the rolling buffer stores a result associated with the set of input data as an intermediate data set.

12. The system according to claim 9, further comprising a convolutional neural network (CNN) accelerator circuit coupled to the processor and a sensor, the CNN accelerator streams the subset from the sensor to the processor.

13. The system according to claim 12, wherein CNN accelerator circuit comprises a per-channel data memory.

14. The system according to claim 12, wherein the set of input data is shifted row-by-row from the sensor to a memory device in a sequential fashion such that data that has been shifted from one or more rows is available for processing.

15. The system according to claim 9, wherein the processor discards at least some of the subset after outputting the first set of output data.

16. A non-transitory computer-readable medium or media comprising one or more sequences of instructions which, when executed by at least one processor, causes steps to be performed comprising:
a non-transitory computer-readable medium comprising instructions that, when executed by a processor, cause steps to be performed, the steps comprising:
determining one or more active neural network layers in a neural network using counters, wherein the counters control a set of input data by counting input shifts of data into the one or more active neural network layers relative to at least one shift value to identify the one or more active neural network layers;
using the one or more active neural network layers to process the subset of a set of input data of a first neural network layer the subset having a data size that is substantially less than the size of the set of input data;
outputting a first set of output data from the first neural network layer;
using first set of output data in a second neural network layer; and
outputting a second set of output data from the second neural network layer prior to processing all of the set of input data.

17. The non-transitory computer-readable medium or media according to claim 16, wherein the processor discards at least some of the subset after outputting the first set of output data.

18. The non-transitory computer-readable medium or media according to claim 16, wherein the size of the subset depends at least on one of a pooling stride and a type of convolution, or the type of the neural network.

19. The non-transitory computer-readable medium or media according to claim 16, wherein outputting the first set of output data comprises generating an output pixel in response to using input data up to and including a first input pixel and ignoring input data following the first input pixel.

20. The non-transitory computer-readable medium or media according to claim 16, wherein a dimension of an output of the first neural network layer is greater than a dimension of an output of the second neural network layer.

* * * * *